(12) United States Patent
Pourseyed et al.

(10) Patent No.: US 9,832,037 B2
(45) Date of Patent: Nov. 28, 2017

(54) METHOD AND APPARATUS FOR REGISTER SETTING VIA MULTIPLEXED CHIP CONTACTS

(71) Applicant: Sierra Wireless, Inc., Richmond, British Columbis (CA)

(72) Inventors: Behrouz Pourseyed, Richmond (CA); Markus Myers, Richmond (CA)

(73) Assignee: Sierra Wireless, Inc. (CA)

( * ) Notice: Subject to any disclaimer, the term of this patent is extended or adjusted under 35 U.S.C. 154(b) by 326 days.

(21) Appl. No.: 14/578,872

(22) Filed: Dec. 22, 2014

(65) Prior Publication Data

US 2016/0182250 A1   Jun. 23, 2016

(51) Int. Cl.
*H05K 7/10* (2006.01)
*H04L 12/40* (2006.01)
*G06F 13/40* (2006.01)

(52) U.S. Cl.
CPC ...... *H04L 12/40013* (2013.01); *G06F 13/409* (2013.01); *G06F 13/4068* (2013.01)

(58) Field of Classification Search
USPC ......................................... 710/300–308, 110
See application file for complete search history.

(56) References Cited

U.S. PATENT DOCUMENTS

| | | |
|---|---|---|
| 4,173,769 A | 11/1979 | van Straaten |
| 4,293,870 A | 10/1981 | Steckler et al. |
| 4,434,474 A | 2/1984 | Best et al. |
| 4,675,550 A | 6/1987 | Hafner |
| 5,532,655 A | 7/1996 | Nguyen et al. |
| 5,594,442 A | 1/1997 | Paulos et al. |
| 5,594,874 A | 1/1997 | Narayanan et al. |
| 5,615,678 A * | 4/1997 | Kirkham ............. G10K 11/004 600/459 |
| 6,621,449 B1 * | 9/2003 | Kunert ...................... G01S 7/35 332/126 |
| 7,359,376 B1 | 4/2008 | Horlander et al. |
| 7,962,670 B2 | 6/2011 | Lim et al. |
| 8,072,286 B2 * | 12/2011 | Johansson ............. H01Q 1/246 333/17.3 |
| 9,276,623 B2 * | 3/2016 | Lin .......................... H04B 1/18 |
| 2003/0068052 A1 | 4/2003 | Sendelweck |

(Continued)

FOREIGN PATENT DOCUMENTS

| | | |
|---|---|---|
| GB | 2298328 | 8/1996 |
| SE | WO 2008088256 | 7/2008 |

*Primary Examiner* — Raymond Phan
(74) *Attorney, Agent, or Firm* — Holland & Hart LLP (57) ABSTRACT

A method and apparatus for setting an internal register of an integrated circuit (IC) via a multiplexed pin which also passes an RF signal is provided. An internal RF signal path couples the pin to an internal terminal for the RF signal, and a register setting signal path couples the pin to an internal register. The internal register may be an address register, such as a USID address register of a MIPI RFFE bus. A capacitor on the RF signal path may block the constant voltage, and a resistor or inductor on the register setting signal path may block the RF signal. The integrated circuit may include an RF section and a controller section, where the controller section may be used to control the RF section. The controller section is responsive to an address associated with the address register.

20 Claims, 6 Drawing Sheets

(56) References Cited

U.S. PATENT DOCUMENTS

| | | | |
|---|---|---|---|
| 2006/0123292 A1* | 6/2006 | Bansal | G01R 31/31723 714/724 |
| 2009/0295349 A1* | 12/2009 | Tao | H02M 3/33507 323/282 |
| 2012/0303836 A1* | 11/2012 | Ngo | G06F 13/4247 710/10 |
| 2014/0006649 A1* | 1/2014 | Wiley | H04L 25/02 710/8 |

* cited by examiner

410
Operatively coupling an internal radiofrequency (RF) terminal of the integrated circuit to an external radiofrequency (RF) terminal via a dual-use pin of the integrated circuit apparatus.

420
Operatively coupling an external source of a constant voltage to an internal register of the integrated circuit apparatus via the dual-use pin, the external source of the constant voltage configured for setting of the internal register.

METHOD AND APPARATUS FOR REGISTER SETTING VIA MULTIPLEXED CHIP CONTACTS

FIELD OF THE INVENTION

The present invention pertains to the field of integrated circuits and in particular to a method and apparatus for setting registers of an integrated circuit via multiplexed contacts of the integrated circuit.

BACKGROUND

Radiofrequency (RF) electronics components, such as power amplifiers, low-noise amplifiers, filters, switches, power management modules, tuners, and sensors, provided on integrated circuits and for use in wireless communication systems such as smartphones are prevalent in current technology. Many such components include a control interface usable for controlling operation of the components. One such control interface is the RF Front-End (RFFE) Control Interface as specified by the MIPI™ Alliance. The RFFE is a standard three-pin control interface which currently supports a master and up to 15 slave devices per bus, with a master capable of hosting more than one bus. Slave devices on a common bus may be addressed using one of 15 different possible addresses, referred to herein as Unique Slave Identifier (USID) addresses. A standard implementation for full USID address configurability of a slave device would require four input pins for setting the device's address register, for example via pull-up and/or pull-down resistors. However, the incorporation of four address pins in a chip device is problematic due to device size and cost constraints. As such, not all RFFE compatible devices are configurable to the full range of USID addresses. Rather, it is common for devices to have fixed USID addresses or limited configurability thereof.

Integrated circuit inputs settable by pull-up and/or pull-down resistors are commonly used in the electronics industry. Such inputs may be associated with a digital state of the integrated circuit, for example via an input register. However, the incorporation of a separate, dedicated pin for setting each register individually is again problematic due to device size and cost constraints.

U.S. Pat. No. 5,532,655 discloses a method for using the same input/output pin on an integrated circuit for both a high frequency AC signal and a DC signal simultaneously and a first circuit means to accomplish this multiplexing. According to U.S. Pat. No. 5,532,655, the circuit topology comprises a first and second capacitor, coupled between the AC signal input and the AC signal output. A first and second resistor are coupled to the same input/output pin as the capacitors but between the two capacitors and respectively to a DC signal input and a DC signal output. The DC signal path thus lies between the two capacitors and sees them as open circuits, while the AC signal path sees the two resistors as open circuits and the capacitors as short circuits. However, U.S. Pat. No. 5,532,655 is limited in its disclosure and subject to improvement, for example with respect to applicability to setting of address registers of RFFE devices.

Therefore there is a need for a method and apparatus and system for register setting via multiplexed chip contacts that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and apparatus for register setting via multiplexed chip contacts. In accordance with an aspect of the present invention, there is provided an integrated circuit apparatus comprising: a pin configured for coupling to both of: an external radiofrequency (RF) terminal for supplying or receiving an RF signal; and a source of a constant voltage for setting an internal register of the integrated circuit apparatus; a radiofrequency (RF) signal path configured to couple the pin to an internal terminal for the RF signal; and a register setting signal path configured to couple the pin to the internal register.

In accordance with another aspect of the present invention, there is provided a system comprising: the integrated circuit apparatus comprising: a pin configured for coupling to both of: an external radiofrequency (RF) terminal for supplying or receiving an RF signal; and a source of a constant voltage for setting an internal register of the integrated circuit apparatus; a radiofrequency (RF) signal path configured to couple the pin to an internal terminal for the RF signal; and a register setting signal path configured to couple the pin to the internal register. The system further comprises a pull-up or pull-down resistor path operatively coupled between the pin and a fixed DC voltage or a ground; and an RF signal transmission line operatively coupled between the pin and the external RF terminal.

In accordance with another aspect of the present invention, there is provided a method of operating an integrated circuit apparatus, comprising: operatively coupling an internal radiofrequency (RF) terminal of the integrated circuit to an external radiofrequency (RF) terminal via a dual-use pin of the integrated circuit apparatus; and operatively coupling an external source of a constant voltage to an internal register of the integrated circuit apparatus via the dual-use pin, the external source of the constant voltage configured for setting of the internal register.

DETAILED DESCRIPTION

Definitions

As used herein, the term "register" refers to an electronic component which receives an input signal, such as a constant voltage, and provides a corresponding output signal, such as a logical value. A register may be a simple piece of conductor within an integrated circuit, an analog-to-digital converter, a storage element such as a flip-flop, or the like. A register may include a buffer, amplifier, filter, or similar element. The register may be a one-bit register although multi-bit registers are also possible. The state of the register may be used as a logical input to other circuitry and may be used for setting various adjustable parameters, such as USID address.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

In accordance with an embodiment of the present invention, there is provided an integrated circuit apparatus. The integrated circuit apparatus includes a pin configured for coupling to both an external radiofrequency (RF) terminal for supplying or receiving an RF signal; and to a source of a constant voltage for setting an internal register of the integrated circuit apparatus. The integrated circuit apparatus further includes a radiofrequency (RF) signal path configured to couple the pin to an internal terminal for the RF signal. The integrated circuit apparatus further includes a register setting signal path configured to couple the pin to the internal register.

In various embodiments, the integrated circuit apparatus may include multiple pins such as described above. For example, the apparatus may further include one or more additional pins each configured for coupling to both of one or more additional external radiofrequency (RF) terminals for supplying or receiving one or more additional RF signals; and one or more additional sources of one or more additional constant voltages for setting one or more additional internal registers of the integrated circuit apparatus. The apparatus may also include one or more additional radiofrequency (RF) signal paths each configured to couple a respective one of the one or more additional pins to a respective one or more additional internal terminals for the one or more additional RF signals. The apparatus may also include one or more additional register setting signal paths each configured to couple a respective one of the one or more additional pins to a respective one of the one or more additional internal registers. As such, multiple registers, such as USID address registers, may be independently set by the use of multiple dual-purpose pins.

In accordance with another embodiment of the present invention, there is provided an electronics system comprising the integrated circuit apparatus as described above, and further comprising a pull-up or pull-down resistor path operatively coupled between the pin and a fixed DC voltage or a ground and an RF signal transmission line operatively coupled between the pin and the external RF terminal. The system may include multiple pull-up or pull-down resistor paths for coupling to different dual-use pins of the apparatus, as well as multiple RF signal transmission lines operatively coupled to the same dual-use pins. In some embodiments, the system may also include an RFFE interface bus operatively coupled to the integrated circuit apparatus. Multiple such integrated circuit apparatuses and their associated connections may also be provided in some embodiments, for example with each apparatus coupled to the same RFFE interface bus and configured as a slave device having a different USID address configured at least in part by a particular configuration of pull-up and pull-down resistors coupled to dual-use pins thereof.

In various embodiments, the system may correspond to a Printed Circuit Board (PCB) housing one or more integrated circuit apparatuses as well as RF signal transmission lines, pull-up or pull-down resistor paths, RFFE interface buses, and the like.

An integrated circuit as described herein may be a packaged integrated circuit such as but not limited to a surface mount component. An integrated circuit may also be a semiconductor die, in which case the pins are interpreted as contacts for connection to pins of the packaged integrated circuit.

Figure 1:
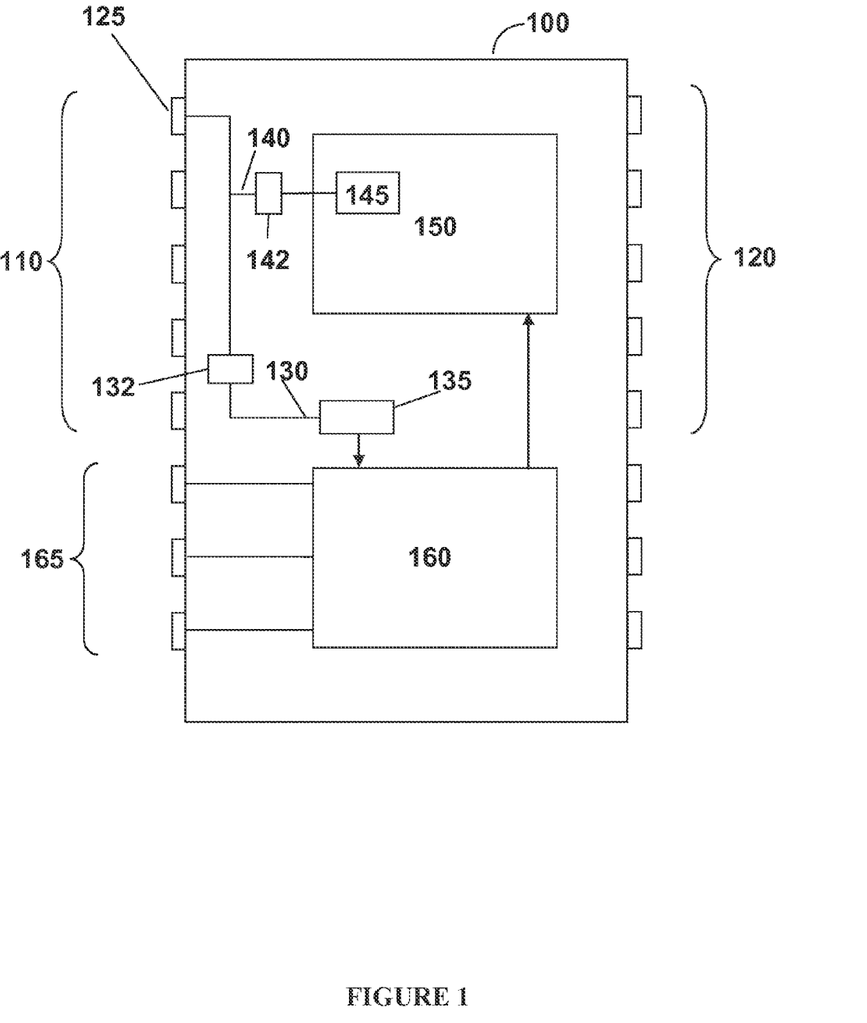
FIG. 1 illustrates an integrated circuit apparatus provided in accordance with embodiments of the invention.

FIG. 1 illustrates an integrated circuit apparatus 100 provided in accordance with an embodiment of the present invention. The apparatus comprises one or more RF input pins 110 configured to receive RF signals, and/or one or more RF output pins 120 configured to provide RF signals. In the present embodiment, the apparatus is configured as an RFFE slave device and further comprises a controller section such as an RFFE control interface section 160 operatively coupled to RFFE interface pins 165 including a clock pin, a serial data pin, and an asynchronous slave reset pin (VIO).

In various embodiments, the RFFE control interface section 160 is operatively coupled an RF section 150 for control thereof. The RF section 150 is coupled to the RF input pins 110 and the RF output pins 120.

At least one pin, for example pin 125, of the RF input pins 110 and/or RF output pins 120 is also coupled to a register setting signal path 130 internal to the apparatus. Although pin 125 is illustrated in the present embodiment as an RF input pin, it is understood that pin 125 may alternatively be one of the RF output pins 120. The register setting signal path is configured to couple the at least one pin 125 to an internal register 135 of the apparatus. In the present embodiment the internal register may be a USID register operatively coupled to the RFFE control interface section 160 and configured for setting a USID address of the apparatus, as an RFFE slave device. In some embodiments, up to four such pins may be provided for setting up to four different bits of the USID address. Pins coupled to both a register setting signal path and the RF section may additionally or alternatively be used for setting other registers of the integrated circuit.

The pin 125 is also coupled to a RF signal path 140 which in turn couples the pin to an internal RF signal terminal 145 of the RF section 150. The RF signal terminal may emit or receive an appropriate RF signal having components within an RF frequency band. The RF signal terminal may, for example, be associated with a power amplifier, low-noise amplifier, RF front-end, RF switch, RF transceiver terminal, antenna terminal, filter, switch, power management module, tuner, sensor, or the like, or a combination thereof. The other RF input pins 110 and/or RF output pins 120 may be coupled to similar RF signal terminals.

In various embodiments, the register setting signal path 130 may be configured to pass a constant voltage applied to the pin 125 from an external source of constant voltage and to block an RF signal associated with the RF signal terminal. The blocking may be performed by configuring the register setting signal path to exhibit a high impedance at RF frequencies. Such blocking may be desired since the RF signal passes through the pin 125 which is conductively coupled to the register setting signal path 130 and hence might otherwise be transmitted to the register 135. This may potentially interfere with operation of the register 135. In some embodiments, the register setting signal path 130 may include a blocking element 132 such as a low-pass filter, a series resistor, a series inductor, or the like, which is configured to block a substantial portion of the RF signal while passing the constant voltage. For example, a series resistor may be sufficiently large so as to act substantially as an open circuit or high-impedance circuit to RF frequencies in at least a predetermined frequency band. Resistors at RF frequencies typically exhibit reactance, such as parasitic capacitance and inductance, and as such an on-chip resistor may be selected which attenuates RF frequencies due to such effects. Additionally or alternatively, the register setting signal path may be configured to exhibit transmission line effects which attenuate the RF signal.

In some embodiments, the register 135 may be configured to be robust to variations at RF frequencies. For example, the register 135 may be configured to filter the RF frequencies and to output a constant value in accordance with a time-averaged value of the input voltage applied thereto by the register setting signal path 130. Further, the register itself may exhibit a high impedance at RF frequencies.

In various embodiments, the RF signal path 140 may be configured to pass an RF signal associated with the RF terminal and to block a constant voltage applied to the pin 125 from an external source of constant voltage. Such blocking may be desired since the constant voltage signal passes through the pin 125 which is conductively coupled to the RF signal path 140 and hence might otherwise be transmitted to the RF signal terminal 145. This may potentially interfere with operation of RF components associated with the RF signal terminal 145. In some embodiments, the RF signal path 140 may include a blocking element 142 such as a series capacitor or other high-pass filter, or the like, which is configured to block the constant voltage while passing the RF signal in at least a predetermined frequency band.

As mentioned above, in various embodiments the control interface section 160 may be used to control the RF section 150 via signals presented to the interface pins 165, in particular including the serial data pin. The pin 125 may be used to set an address register, such as the register 135, associated with the control interface section 160. As such, rather than using the pin 125 to directly control the RF section 150 while also passing an RF signal to or from the RF section, the pin 125 may be used in an indirect manner to facilitate control of the RF section, for example by adjusting an address to which the control interface section 160 is responsive.

In various embodiments, the controller section, such as the RFFE control interface section 160, is operatively coupled to the RF section for control of the RF section, which includes the RF signal terminal 145. The controller section is externally addressable via a signal pattern specifying an address of the controller section. This may be an RFFE serial data signal pattern addressing the controller section as a slave device, and further specifying associated command or control data, as would be readily understood by a worker skilled in the art. Further, the address of the controller section is based at least in part on a state of the address register. Yet further, the signal pattern may be usable to direct control of the RF section by the controller section.

Figure 2:
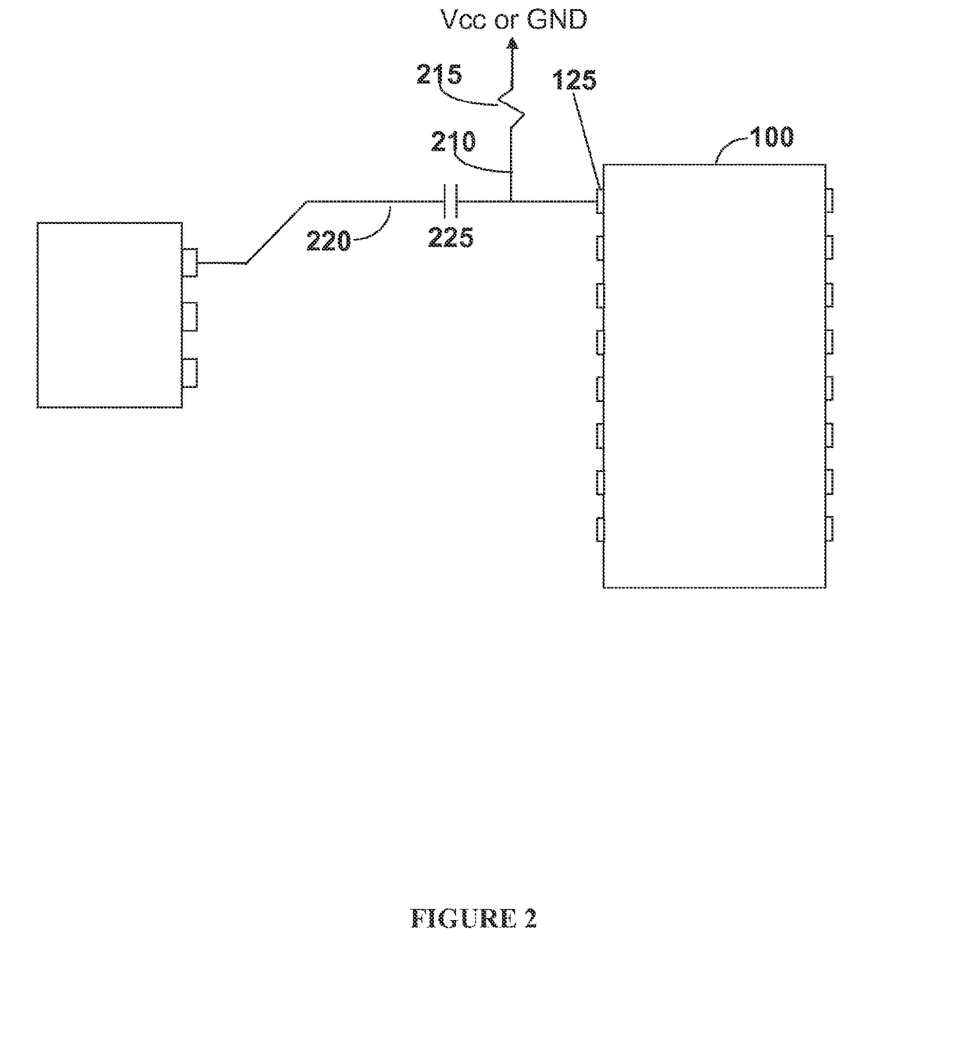
FIG. 2 illustrates a system comprising the integrated circuit apparatus of FIG. 1, in accordance with embodiments of the present invention.

FIG. 2 illustrates the configuration of external connections to the pin 125 of the integrated circuit apparatus 100 of FIG. 1, in accordance with some embodiments of the present invention. A pull-up or pull-down resistor path 210 is provided which couples the pin 125 to a source of constant voltage, such as a fixed DC voltage or ground. The fixed DC voltage may, for example, be an operating voltage (Vcc) associated with a printed circuit board housing the integrated circuit apparatus 100. The pull-up or pull-down resistor path 210 may be fixed or adjustable for example by the use of jumpers or other configurable electronic components. The pull-up or pull-down resistor path 210 includes a resistor 215. In some embodiments, the resistor 215 may be configured to pass the constant voltage and to block the RF signal. In some embodiments, the resistor 215 may be configured to allow an attenuated or non-attenuated version of the RF signal to be transmitted past the resistor path, between the pin 125 and an external RF terminal. The amount of the attenuation may be limited to a desired amount for example through the configuration of the resistor or other element in the resistor path. The resistor path may be configured so as to limit an amount of noise introduced therethrough into the RF signal. For example, noise suppression circuitry may be included in the resistor path.

An external RF signal transmission line 220 is also provided which couples the pin 125 to an external RF terminal acting as a signal source or destination. In some embodiments the RF signal transmission line may be configured to pass the RF signal and to block the constant voltage. For example, a capacitor 225 such as an AC coupling capacitor may be provided having a capacitance which is configured to pass the RF signal and to block the constant voltage. In some embodiments, such an AC coupling capacitor may be omitted, for example when the external RF terminal exhibits high impedance at DC and is tolerant to the constant voltage.

Figure 3:
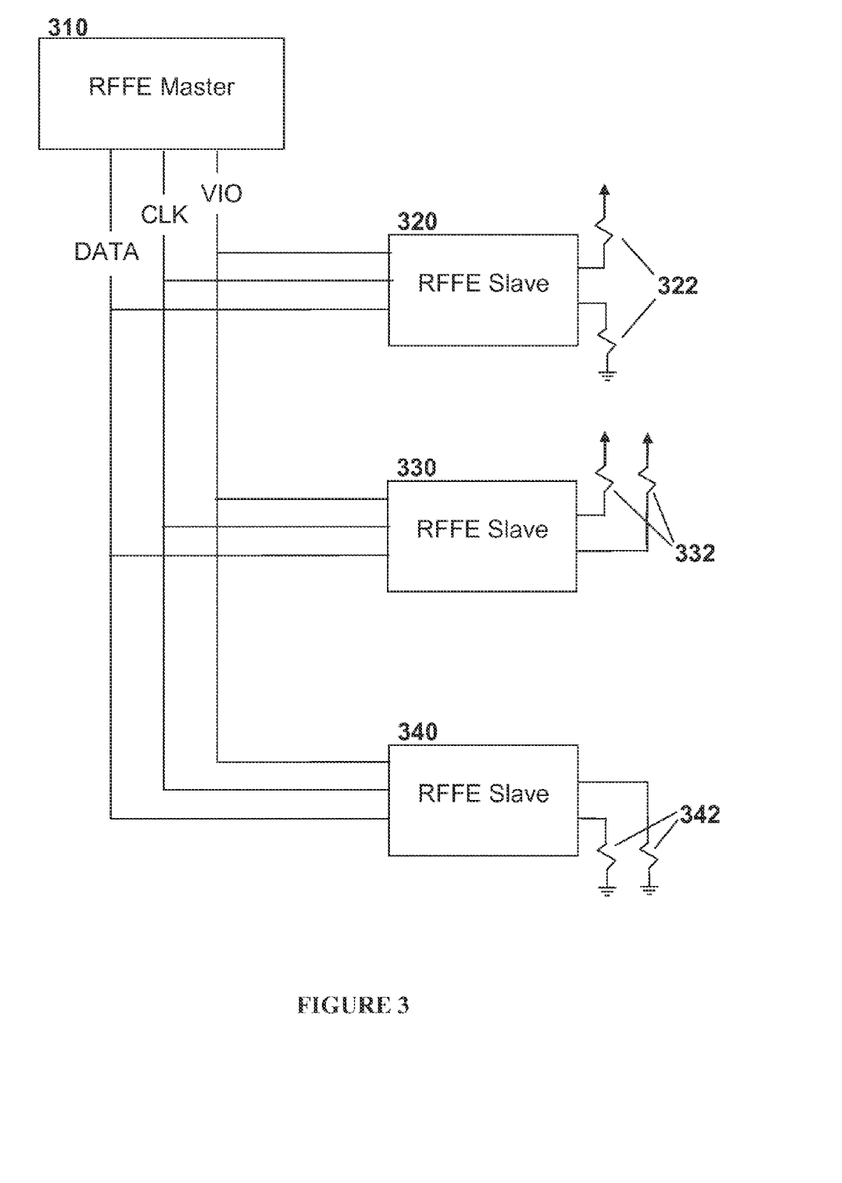
FIG. 3 illustrates a system comprising plural integrated circuit apparatuses, in accordance with embodiments of the present invention.

FIG. 3 illustrates a system comprising multiple integrated circuit apparatuses coupled to a common MIPI RFFE bus and configured as an RFFE master device 310 and multiple RFFE slave devices 320, 330, 340 having different USID addresses. The addresses of the RFFE slave devices 320, 330, 340 are configurable by tying address input pins to a Vcc voltage or ground through pull-up or pull-down resistor paths 322, 332, 342, respectively. Each of the pull-up or pull-down resistor paths 322, 332, 342 are coupled to Vcc and ground in a different pattern, thereby configuring the respective RFFE slave devices 320, 330, 340 with different addresses. The address input pins may be dual-use pins which also transmit or receive an RF signal as described elsewhere herein.

Figure 4:
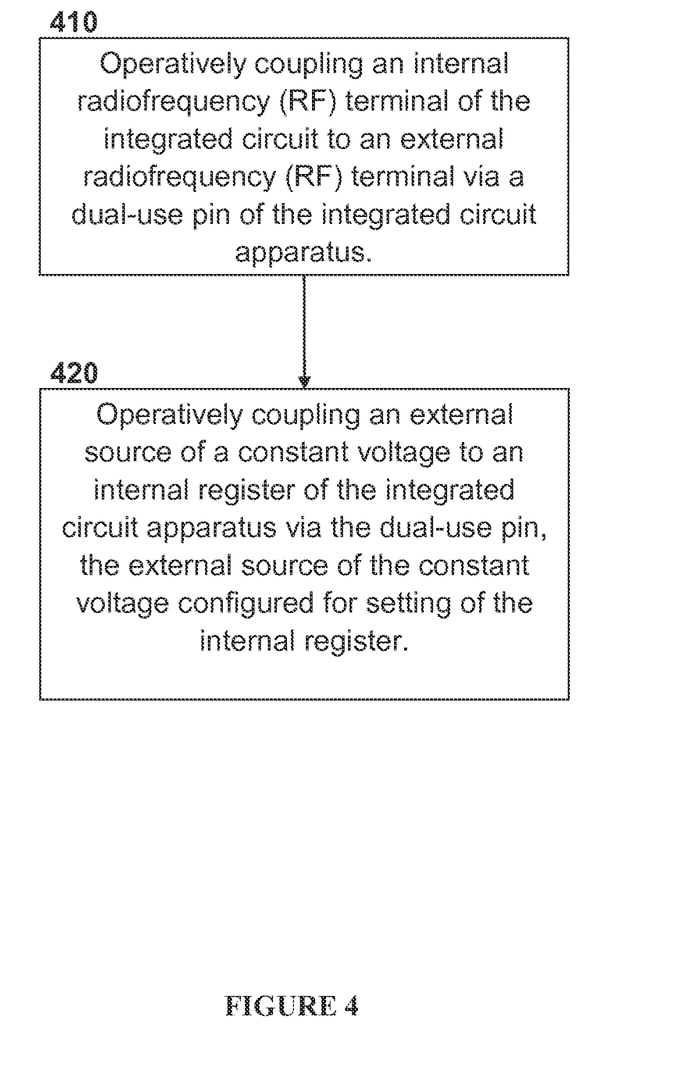
FIG. 4 illustrates a method provided in accordance with embodiments of the present invention.

In accordance with another aspect of the present invention, and with reference to FIG. 4, there is provided a method of operating an integrated circuit apparatus. The method includes operatively coupling 410 an internal radiofrequency (RF) terminal of the integrated circuit to an external radiofrequency (RF) terminal via a dual-use pin of the integrated circuit apparatus. The method further includes operatively coupling 420 an external source of a constant voltage to an internal register of the integrated circuit apparatus via the dual-use pin, the external source of the constant voltage configured for setting of the internal register. In some embodiments, operatively coupling the external radiofrequency (RF) terminal to the internal radiofrequency (RF) terminal of the integrated circuit includes conveying an RF signal between the dual-use pin and the internal RF terminal via an RF signal path. In some embodiments, operatively coupling the external source of the constant voltage to the internal register of the integrated circuit apparatus includes conveying the constant voltage to the internal register via a register setting signal path. Operative coupling may further include blocking the RF signal from reaching the internal register and/or blocking the constant voltage from reaching the internal RF terminal, for example by employing series resistors, capacitors or inductors, or high-pass and/or low-pass filters as appropriate.

The method may further comprise controlling an RF section of the integrated circuit using a controller section of the integrated circuit, wherein the RF section includes the RF terminal and the internal register is used in setting an address of the controller section. The method may further include providing a signal to the controller section which specifies the set address of the controller section, the signal used in directing the controller section to control the RF section in a manner specified by the signal.

Figure 5:
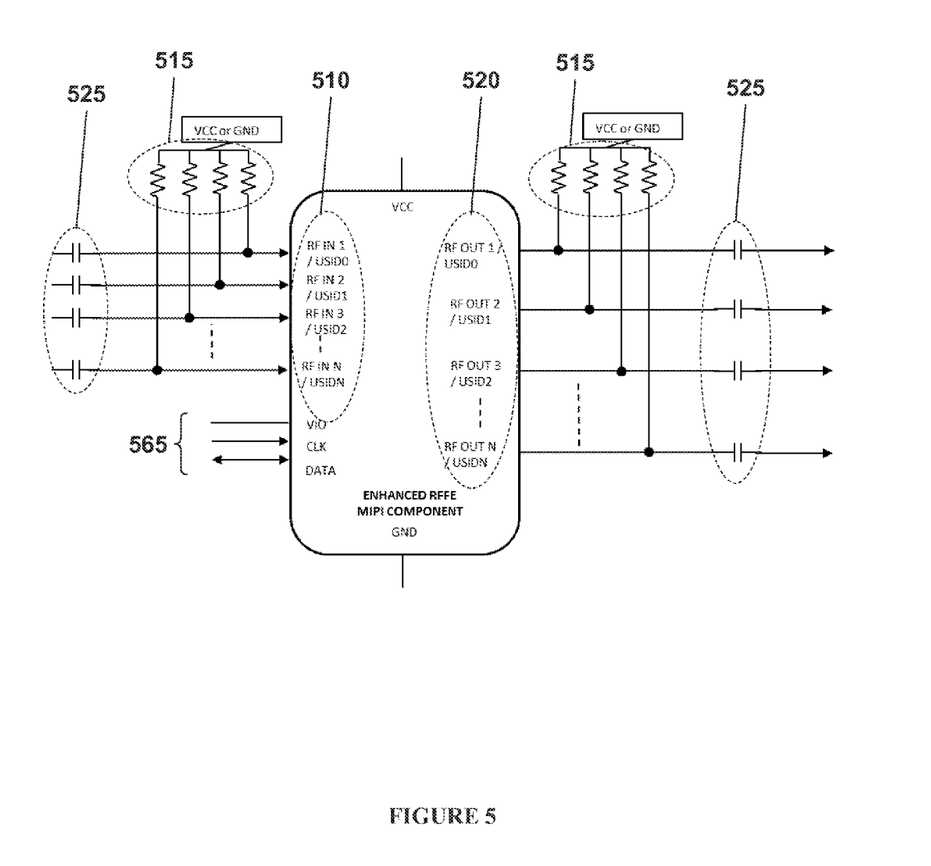
FIG. 5 illustrates an integrated circuit apparatus and system comprising same, in accordance with embodiments of the present invention.

FIG. 5 illustrates an integrated circuit apparatus, in accordance with an embodiment of the present invention, including potentially multiple pins 510, 520 each of which are configured for coupling to both of a respective external RF terminal and a source of constant voltage for setting of a respective register, such as a USID address setting register. The integrated circuit apparatus further includes RFFE interface pins 565 including a clock pin, a serial data pin, and an asynchronous slave reset pin (VIO) for addressing the integrated circuit when the appropriate USID address is specified. Setting of the registers is performed by use of pull-up or pull-down resistors 515. AC coupling capacitors 525 are also illustrated for inhibiting the constant voltage applied via the pull-up or pull-down resistors 515 from reaching the external RF terminals.

Figure 6A:
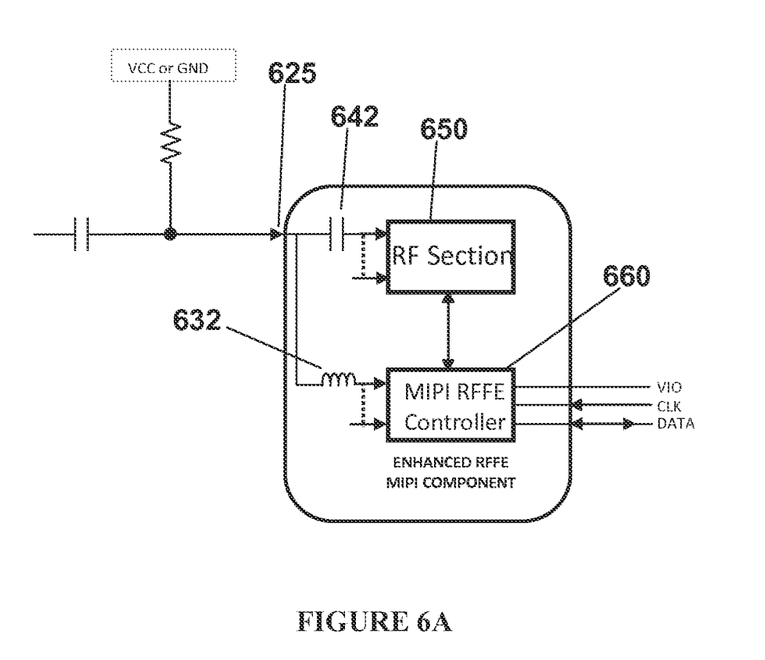
FIGS. 6A and 6B illustrate integrated circuit apparatus and systems comprising same, in accordance with embodiments of the present invention.
Figure 6B:
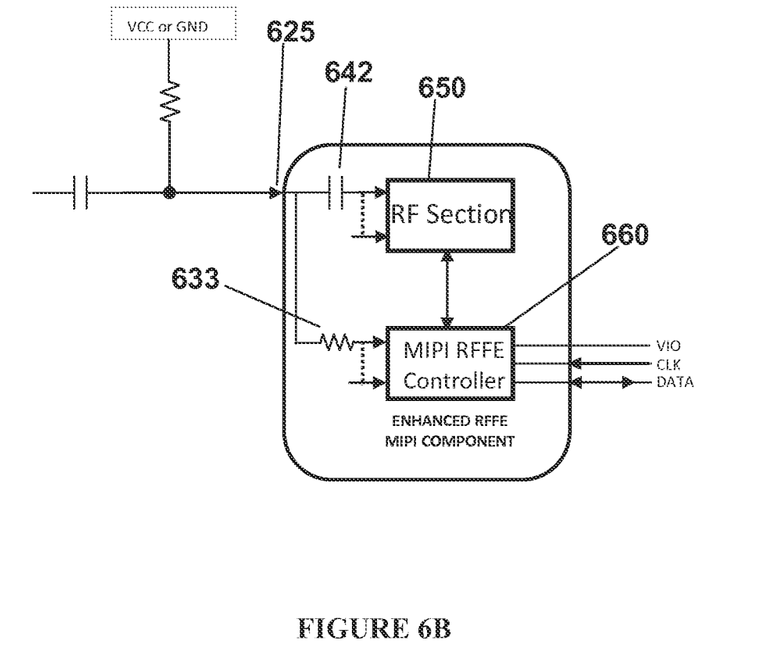

FIGS. 6A and 6B each illustrate an integrated circuit apparatus in accordance with another embodiment of the present invention. A pin 625 is coupled to both an RF section 650 and a control interface section 660. The pin 625 may be coupled to an address register of the control interface section 660. A capacitor 642 is provided for blocking constant voltage applied to the pin 625 from reaching the RF section 650. An inductor 632 (FIG. 6A) or resistor 633 (FIG. 6B) is provided for presenting a high impedance at RF in order to inhibit RF signals seen at the pin 625 and the RF section 650 from reaching the control interface section 660. A discrete component inductor need not be used, but rather the inductor 632 may represent a high impedance characteristic with respect to RF frequencies.

Embodiments of the present invention may be used to facilitate a size reduction in integrated circuit RF components, by facilitating a reduction in the number of pins thereof. More particularly, since some pins may be used for dual functionality, the number of pins may be reduced while retaining a desired amount of input/output interface function. Embodiments of the present invention may use existing RF pins of the integrated circuit for dual functionality, namely for both conveying an RF signal and setting a register such as a RFFE MIPI registers setting indicative of RFFE USID.

Embodiments of the present invention may allow a designer to place multiple instances of the same type of RFFE component (such as an RF Switch or Power Amplifier) on the same RFFE MIPI bus. This is facilitated by making the USID of the RFFE components programmable via one or more pull-up or pull-down resistors coupled to one or more registers of the RFFE components.

Embodiments of the present invention may be used to facilitate expansion of the programmable range of USID addresses of an RIFE component without increasing the pin-out requirement of the component integrated circuit. The current generation of MIPI RF Switches (or PAs) may not have an externally configurable USID pin or only support a one-bit address. Embodiments of the present invention may be used to provide an increased number of address input pins, such as two or more input pins, thereby supporting an increased number of bits of programmable USED address by using the input RF pin(s) and/or output RF pin(s) of the device concurrently for both RF and register setting functionalities.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. An integrated circuit apparatus comprising:
   a) a pin configured for coupling to both of:
      i) an external radiofrequency (RF) terminal for supplying or receiving an RF signal; and
      ii) a source of a constant voltage for setting an internal register of the integrated circuit apparatus;
   b) a radiofrequency (RF) signal path configured to couple the pin to an internal terminal for the RF signal; and
   c) a register setting signal path configured to couple the pin to the internal register, wherein the internal register is an address register used in setting an address of the integrated circuit apparatus, and wherein the integrated circuit apparatus is configured for coupling to a RFFE interface bus and wherein the address register is used in setting a USID address of the integrated circuit apparatus in association with the RFFE interface bus.

2. An integrated circuit apparatus comprising:
   a) a pin configured for coupling to both of:
      i) an external radiofrequency (RF) terminal for supplying or receiving an RF signal; and
      ii) a source of a constant voltage for setting an internal register of the integrated circuit apparatus;
   b) a radiofrequency (RF) signal path configured to couple the pin to an internal terminal for the RF signal; and
   c) a register setting signal path configured to couple the pin to the internal register, wherein the internal register is an address register used in setting an address of the integrated circuit apparatus, and wherein the integrated circuit apparatus further comprises a controller section and an RF section, the controller section operatively coupled to the RF section for control of the RF section, wherein the RF section includes the internal terminal for the RF signal, and wherein the controller section is externally addressable via a signal pattern specifying an address of the controller section, the address based at least in part on a state of the address register, and wherein the signal pattern is usable to direct control of the RF section by the controller section.

3. An integrated circuit apparatus comprising:
   a) a pin configured for coupling to both of:
      i) an external radiofrequency (RF) terminal for supplying or receiving an RF signal; and
      ii) a source of a constant voltage for setting an internal register of the integrated circuit apparatus;
   b) a radiofrequency (RF) signal path configured to couple the pin to an internal terminal for the RF signal; and
   c) a register setting signal path configured to couple the pin to the internal register, wherein the RF signal path comprises a high-pass filter or a series capacitor.

4. The apparatus according to claim 3, wherein the internal register is an address register used in setting an address of the integrated circuit apparatus.

5. The apparatus according to claim 3, wherein the source of the constant voltage is a fixed DC voltage or a ground directly coupled to the pin via a pull-up or a pull-down resistor.

6. An integrated circuit apparatus comprising:
a) a pin configured for coupling to both of:
   i) an external radiofrequency (RF) terminal for supplying or receiving an RF signal; and
   ii) a source of a constant voltage for setting an internal register of the integrated circuit apparatus;
b) a radiofrequency (RF) signal path configured to couple the pin to an internal terminal for the RF signal; and
c) a register setting signal path configured to couple the pin to the internal register, wherein the register setting signal path comprises a low-pass filter, a series resistor, or a series inductor.

7. The apparatus according claim 3, wherein the register setting signal path is configured to pass the constant voltage and to block the RF signal.

8. The apparatus according to claim 4, wherein the integrated circuit apparatus is configured for coupling to a RFFE interface bus and wherein the address register is used in setting a USID address of the integrated circuit apparatus in association with the RFFE interface bus.

9. The apparatus according to claim 4, wherein the integrated circuit apparatus further comprises a controller section and an RF section, the controller section operatively coupled to the RF section for control of the RF section, wherein the RF section includes the internal terminal for the RF signal, and wherein the controller section is externally addressable via a signal pattern specifying an address of the controller section, the address based at least in part on a state of the address register, and wherein the signal pattern is usable to direct control of the RF section by the controller section.

10. The apparatus according to claim 6, wherein the internal register is an address register used in setting an address of the integrated circuit apparatus.

11. The apparatus according to claim 6, wherein the RF signal path is configured to pass the RF signal and to block the constant voltage.

12. An integrated circuit apparatus comprising:
a) a pin configured for coupling to both of:
   i) an external radiofrequency (RF) terminal for supplying or receiving an RF signal; and
   ii) a source of a constant voltage for setting an internal register of the integrated circuit apparatus;
b) a radiofrequency (RF) signal path configured to couple the pin to an internal terminal for the RF signal; and
c) a register setting signal path configured to couple the pin to the internal register, the apparatus further comprising:
d) one or more additional pins configured for coupling to both of:
   i) one or more additional external radiofrequency (RF) terminals for supplying or receiving one or more additional RF signals; and
   ii) one or more additional sources of one or more additional constant voltages for setting one or more additional internal registers of the integrated circuit apparatus;
e) one or more additional radiofrequency (RF) signal paths each configured to couple a respective one of the one or more additional pins to a respective one or more additional internal terminals for the one or more additional RF signals; and
f) one or more additional register setting signal paths each configured to couple a respective one of the one or more additional pins to a respective one of the one or more additional internal registers.

13. A system comprising:
a) an integrated circuit apparatus including:
   i) a pin configured for coupling to both of:
      (1) an external radiofrequency (RF) terminal for supplying or receiving an RF signal; and
      (2) a source of a constant voltage for setting an internal register of the integrated circuit apparatus;
   ii) a radiofrequency (RF) signal path configured to couple the pin to an internal terminal for the RF signal; and
   iii) a register setting signal path configured to couple the pin to the internal register;
b) a pull-up or pull-down resistor path operatively coupled between the pin and a fixed DC voltage or a ground;
c) an RF signal transmission line operatively coupled between the pin and the external RF terminal; and
d) an RFFE interface bus operatively coupled to the integrated circuit apparatus, and wherein the internal register is an address register used in setting a USID address of the integrated circuit apparatus in association with the RFFE bus.

14. The system according to claim 13, further comprising at least one additional integrated circuit apparatus operatively coupled to the RFFE bus.

15. The system according to claim 13, wherein the RF signal transmission line is configured to pass the RF signal and to block the constant voltage.

16. The system according to claim 13, wherein the pull-up or pull-down resistor path is configured to pass the constant voltage and to block the RF signal.

17. The system according to claim 14, wherein the at least one additional integrated circuit apparatus is an integrated circuit apparatus according to claim 1, the system further comprising:
a) an additional pull-up or pull-down resistor path operatively coupled between the pin of one of the additional integrated circuit apparatus and the fixed DC voltage or the ground; and
b) an additional RF signal transmission line operatively coupled between the pin of one of the additional integrated circuit apparatus and the external RF terminal or a further RF terminal.

18. A method of operating an integrated circuit apparatus, comprising:
operatively coupling an internal radiofrequency (RF) terminal of the integrated circuit to an external radiofrequency (RF) terminal via a dual-use pin of the integrated circuit apparatus; and
operatively coupling an external source of a constant voltage to an internal register of the integrated circuit apparatus via the dual-use pin, the external source of the constant voltage configured for setting of the internal register;
the method further comprising controlling an RF section of the integrated circuit apparatus using a controller section of the integrated circuit apparatus, wherein the RF section includes the RF terminal and wherein the internal register is used in setting an address of the controller section, the method further comprising providing an external signal to the controller section, the external signal specifying the address of the controller section, the external signal configured to direct the controller section to control the RF section.

19. The method according to claim 18, wherein operatively coupling the external radiofrequency (RF) terminal to the internal radiofrequency (RF) terminal of the integrated circuit comprises conveying an RF signal between the dual-use pin and the internal RF terminal via an RF signal path.

20. The method according to claim 18, wherein operatively coupling the external source of the constant voltage to the internal register of the integrated circuit apparatus comprises conveying the constant voltage to the internal register via a register setting signal path.

* * * * *

UNITED STATES PATENT AND TRADEMARK OFFICE
CERTIFICATE OF CORRECTION

PATENT NO.        : 9,832,037 B2
APPLICATION NO.   : 14/578872
DATED             : November 28, 2017
INVENTOR(S)       : Behrouz Pourseyed and Markus Myers It is certified that error appears in the above-identified patent and that said Letters Patent is hereby corrected as shown below:

Column 7, Line 62, delete "RIFE" and insert --RFFE--

Column 8, Line 2, delete "USED" and insert --USID--

Signed and Sealed this
First Day of May, 2018

Andrei Iancu
*Director of the United States Patent and Trademark Office*